United States Patent [19]

Sahagun

[11] 3,994,263
[45] Nov. 30, 1976

[54] WATERING, OR DRINKING, DEVICE, ESPECIALLY FOR FOWL

[76] Inventor: Miguel Angel Cortes Sahagun, Privada de Andalucia 7, Santa Elena Alcalde, Guadalajara, Estado de Jalisco, Mexico

[22] Filed: Sept. 5, 1975

[21] Appl. No.: 610,633

[52] U.S. Cl. .............................................. 119/75
[51] Int. Cl.² ........................................... A01K 7/02
[58] Field of Search ........................ 119/75, 72.5

[56] References Cited
UNITED STATES PATENTS

| | | | |
|---|---|---|---|
| 1,646,246 | 10/1927 | Hazard | 119/75 |
| 1,744,007 | 1/1930 | Louden | 119/75 |
| 2,845,046 | 7/1958 | Hart | 119/75 |
| 3,428,028 | 2/1969 | Hart | 119/75 |

Primary Examiner—Hugh R. Chamblee
Attorney, Agent, or Firm—Albert L. Jeffers; Roger M. Rickert

[57] ABSTRACT

A watering, or drinking, device for fowl in which a tiltable member in a trough operates a control valve when pressed down by the fowl to admit water into the trough from a water supply pipe.

9 Claims, 13 Drawing Figures

WATERING, OR DRINKING, DEVICE, ESPECIALLY FOR FOWL

The present invention is concerned with an improved arrangement for providing drinking water for fowl, especially upon demand.

Devices for providing drinking water for fowl are important for the health and well being of the fowl but have, heretofore, been lacking in respect of providing fresh, clean water at all times. Prior art devices often permitted the water to become stale and/or contaminated and, also, water could be lost therefrom.

The present invention proposes an arrangement in which the water is supplied on demand and is, thus, fresh and uncontaminated. The water is also supplied only as needed, thereby avoiding waste.

BRIEF SUMMARY OF THE INVENTION

According to the present invention, a water supply pipe is connected to a drinking trough with a normally closed valve in the conduit at the trough end. A member is tiltably, or pivotally, supported in the trough where it will be depressed by the fowl when the fowl places the head in the trough.

A rod extends from the valve to the tiltable member and opens the valve when the member is tilted downwardly by the fowl thereby to admit water into the trough where it becomes available to the fowl.

A spring may urge the valve toward closed position so water is supplied to the trough only upon demand.

The nature of the present invention will become fully apparent upon reference to the following detailed specification taken together with the accompanying drawings in which.

Figure 1:
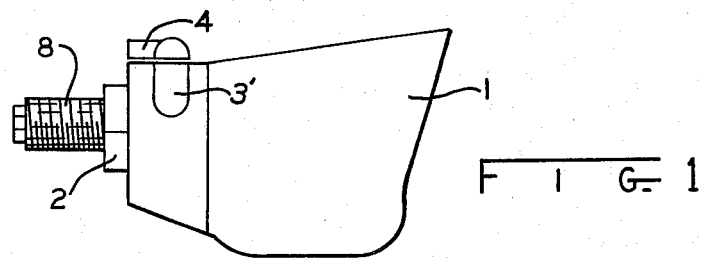
FIG. 1 is a side elevational view of the watering device of the present invention.
Figure 2:
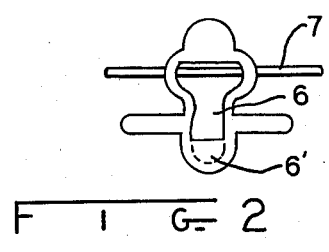
FIG. 2 is a rear elevational view of the valve actuating member tiltable in the device.
Figure 3:
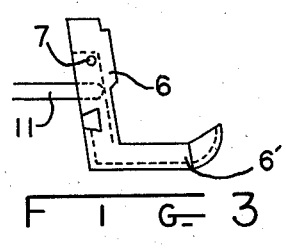
FIG. 3 is a side view of the valve actuating member.
Figure 4:
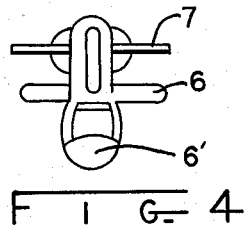
FIG. 4 is a front view of the valve actuating member.
Figure 5A:
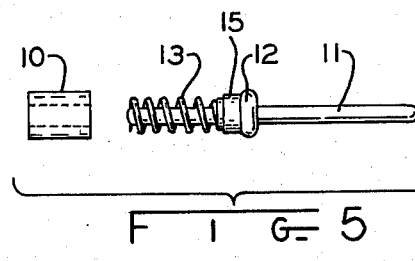
FIG. 5A is an end view of the guide element for the valve rod.
Figure 5:
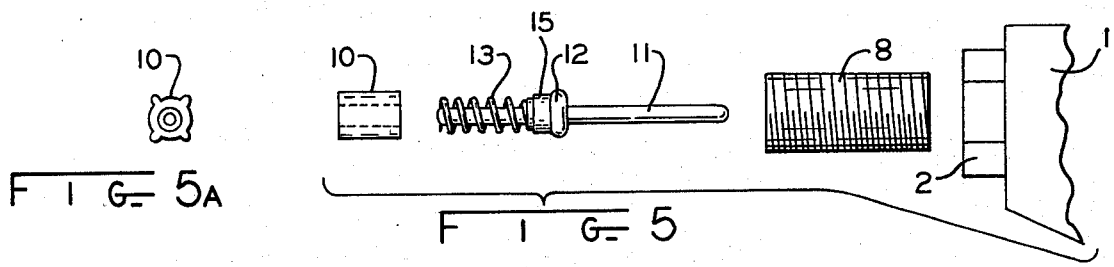
FIG. 5 is an exploded view of the valve of the device.
Figure 6:
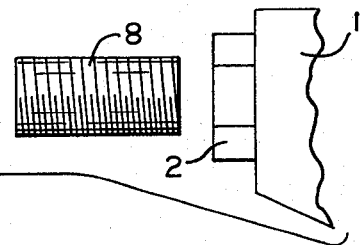
FIG. 6 is a perspective view of the keeper which holds the part of FIGS. 2 to 4 in place.
Figure 8:
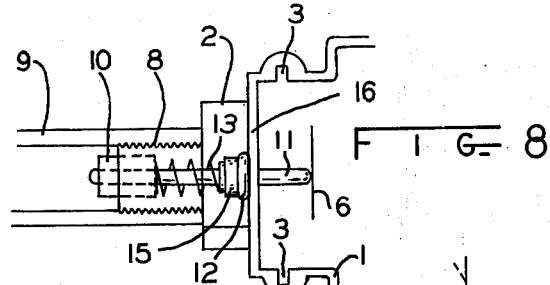
FIG. 8 is a fragmentary plan view showing the valve in closed position.
Figure 7:
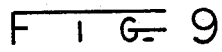
FIG. 7 is a schematic view showing actuation of the valve rod.
Figure 9:
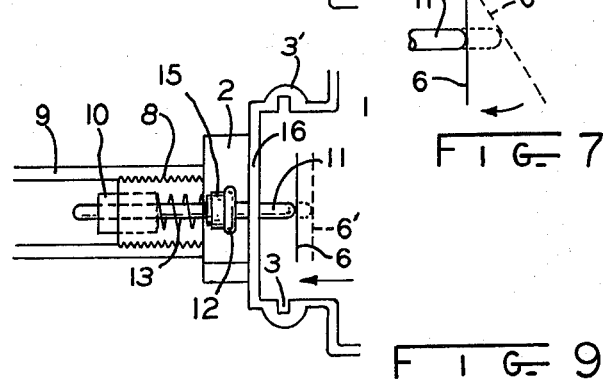
FIG. 9 is a view like FIG. 8 but showing the valve in open position.
Figure 10:
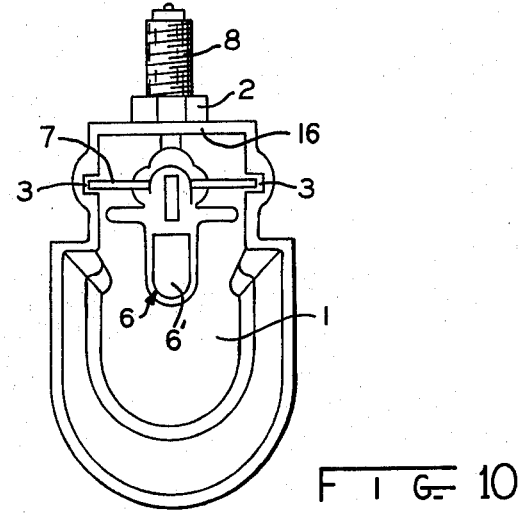
FIG. 10 is a plan view of FIG. 1 with the keeper of FIG. 6 removed therefrom.

DETAILED DESCRIPTION OF THE INVENTION:

Referring to the drawings more in detail, the device of the present invention comprises an upwardly opening trough member 1 having a threaded portion 2 into which a nipple 8 is threaded. Nipple 8 is adapted for connection to a water supply pipe 9 (FIGS. 8 and 9).

A member 6 is tiltably supported in trough 1 by a wire 7, the ends of which are disposed in notches 3 formed in regions 3' of trough 1 near the end where nipple 8 is connected. The tiltable support for member 6 may take the form of shaft portions integral therewith, thus permitting the elimination of wire 7.

A keeper element 4 rests on top of trough 1 and has legs 5 which fit in notches 3 and hold the ends of wire 7 in place.

Member 6 is somewhat spoon-shaped and extends downwardly and then forwardly from wire 7 and has a forwardly projecting portion 6' near the bottom of trough 1. Member 6 is tiltable by engagement by the fowl, for example, by engagement of portion 6' of member 6 by the beak of the fowl.

Nipple 8, on the rearward wall of trough 1, has a valve seat engageable by rubber-like valve member 12. Valve member 12, which may be conventional 'O' ring, is mounted on a rod 11 which extends along the axis of nipple 8 and at the forward end engages the rearwardly facing side of member 6 below wire 7. At the other end, rod 11 is slidably received in externally fluted guide element 10 which may be press fitted into the outer end of nipple 8. A spring 13 acting between guide element 10 and a collar 15 on the rearwad side of valve member 12 urges the valve member toward the valve seat. The valve seat may be a planar wall 16 of the trough member 1.

In operation, when a fowl introduces its head into trough 1 to take water therefrom, member 6 tilts and opens the valve and fresh water enters the trough. When the fowl withdraw its head from trough 1, member 6 is released and the valve closes and shuts off the flow of water.

Member 6 has an opening 6'' leading into the rearward end of portion 6' through which water can flow into portion 6', especially when member 6 is depressed to open valve member 12.

Figure 11:
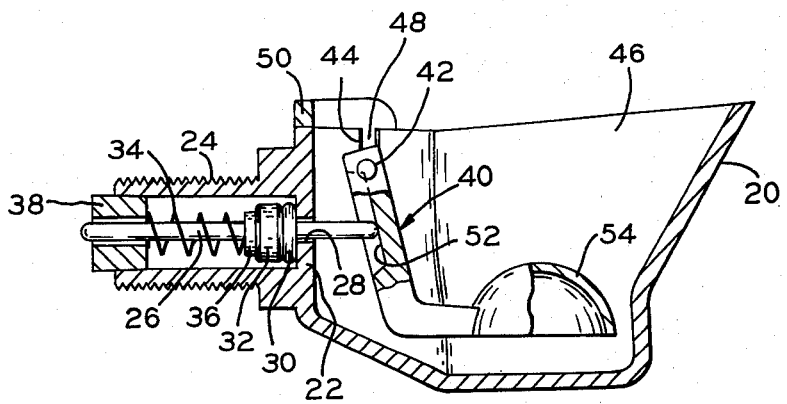
FIG. 11 is a longitudinal section through a modification.
Figure 12:
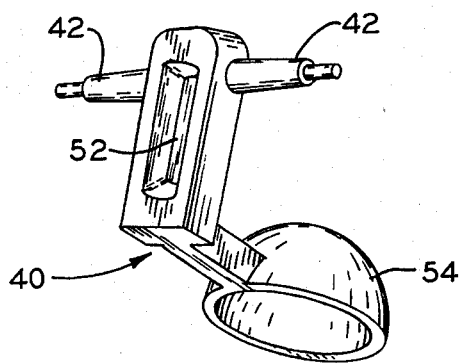
FIG. 12 is a perspective view of the valve actuating member of FIG. 11.

FIGS. 11 and 12 show a modification in which a trough 20 has a rearward wall 22 with a threaded cylindrical extension 24 thereon. Valve rod 26 extends through extension 24 and hole 28 in wall 22 with clearance and has a valve member 30 in the form of an O ring which is engageable with the rearward side of wall 22.

Rod 26 has a collar 32 engaging the rearward side of valve member 30 and a stainless steel spring 34 engages the rearwardly facing side of collar 32, preferably being fitted on tenon 36 on the collar.

A guide element 38, which may be press fitted into cylindrical extension 24 engages the outer end of spring 34 and also slidably receives the outer end of rod 26 with clearance.

Valve actuating member 40, has the supporting shaft elements 42 therefor integrally formed with the member, as will best be seen in FIG. 12. These shaft elements fit in notches 44 formed in the side walls 46 of the trough 20 and are held in place by legs 48 on keeper member 50 mounted on the rearward portion of the trough.

Member 40 has a recess 52 in the back to receive the forward end of rod 26. The lower end of member 40 extends forwardly and has a downwardly concave end region 54 which fits within the trough with small clearance.

Spring 34 normally holds valve member 30 closed and downward tilting of member 40, as will occur when a fowl drinks from the trough will open the valve member.

All parts of the assembly can be formed by plastic molding except those parts identified above as metal or as O rings and which latter are rubber or rubber-like.

Since the valve member is normally closed and is only opened upon demand, loss of water is prevented, even when the supply pressure is low, and the water supplied is always fresh and clean. The valve actuating member can be tilted even by small chicks so the device has wide applicability in the poultry trade.

Modifications may be made within the scope of the appended claims.

What is claimed is:

1. A watering device, especially for fowl, comprising, an upwardly opening trough having a forward and a rearward wall and side walls and closed at the bottom, said side walls having spaced notches, a tiltable member provided with a shaft having its opposed end carried by the notches in the side wall, a keeper member having legs adapted to be received by the spaced notches for retaining the shaft in the notches, a conduit in fluid communication with the trough through said rearward wall to supply water to the trough, a valve mounted within the conduit and carried by the rearward wall of the trough, said rearward wall having an opening for slidably receiving a rod, said rod adapted to engage the rearward side of the tiltable member and also connected to the valve and operable for opening the valve when the tiltable member is tilted in said trough by engagement thereof by a fowl, said rearward wall having a portion serving as the seat for said valve and a spring biasing said valve toward the closed position.

2. A watering device according to claim 1 in which said valve comprises a valve seat coaxial with the conduit, said rod extending through said seat, said valve including a rubber-like valve member mounted on said rod and engageable with the upstream side of said seat.

3. A watering device according to claim 2 in which said valve seat is formed on the rearwardly facing side of said rearward wall and said valve member is in the form of an O ring on said rod.

4. A watering device according to claim 3 which includes a collar on said rod interposed between said spring and said valve member.

5. A watering device according to claim 1 in which said conduit includes a sleeve element on said container and adapted for connection to a water supply pipe, a guide element mounted in the sleeve element and reciprocably supporting the end of the rod opposite the end engaging said member, and passage means formed between said guide element and rod to permit water to flow from the pipe into said sleeve element to the upstream side of the valve.

6. A watering device according to claim 1 in which said member includes an upwardly concave ladle-like portion extending forwardly therefrom and disposed near the bottom of said trough.

7. A watering device according to claim 6 which includes an opening in said member at the rearward end of said ladle portion and slightly above said ladle portion for flow of water into said ladle portion when said valve member is opened.

8. A watering device according to claim 1 in which said member includes a downwardly concave portion extending forwardly therefrom and disposed near the bottom of said trough and operable when pressed downwardly to open said valve member.

9. A watering device according to claim 8 in which said downwardly concave portion of said member is substantially hemispherical, said trough tapering inwardly toward the bottom and defining a small clearance around said portion.

* * * * *